(No Model.) 2 Sheets—Sheet 1.
W. W. GELATT.
CAR COUPLING.
No. 444,096. Patented Jan. 6, 1891.
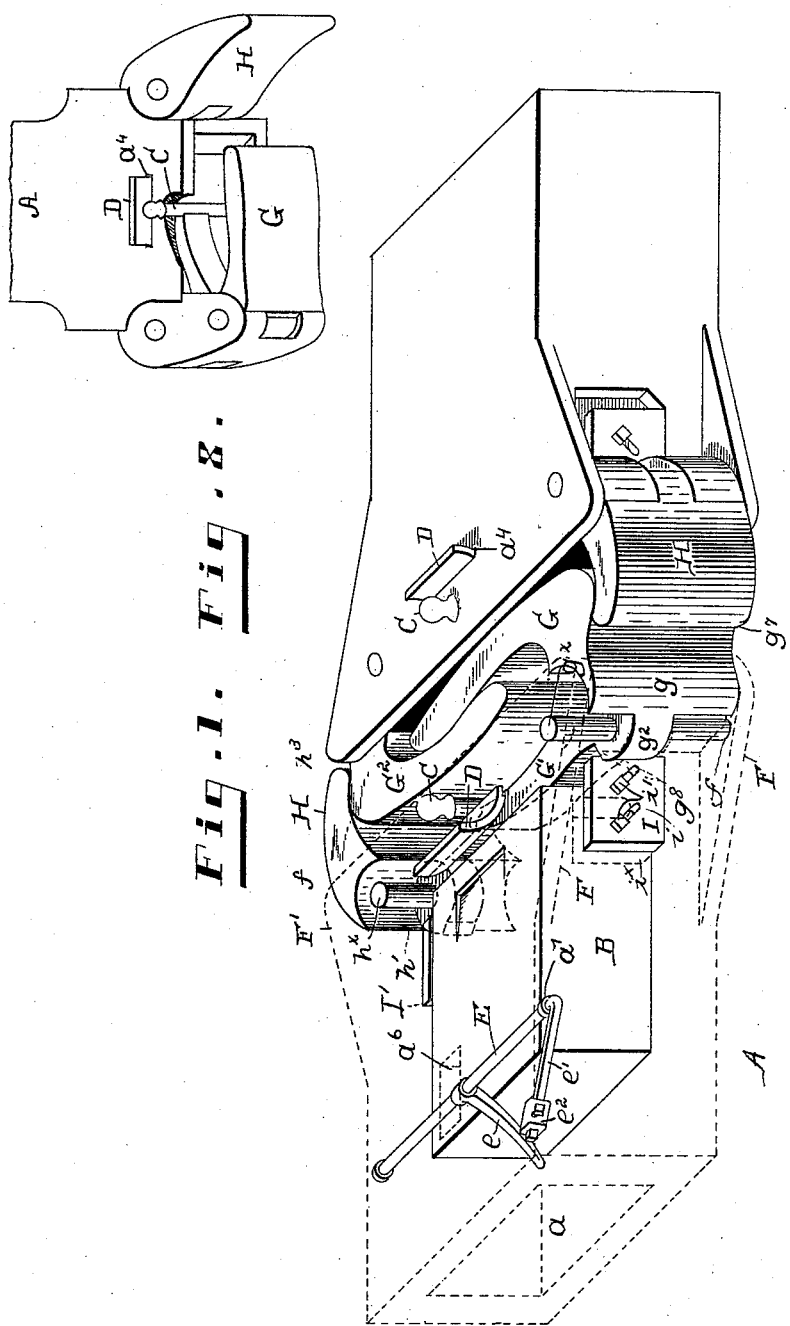
Witnesses:
S. G. Fischer
S. L. C. Hasson
Inventor
Wallace W. Gelatt
By Rich't H. Manning Atty
THE NORRIS PETERS CO., PHOTO-LITHO., WASHINGTON, D. C.

(No Model.) 2 Sheets—Sheet 2.
W. W. GELATT.
CAR COUPLING.
No. 444,096. Patented Jan. 6, 1891.
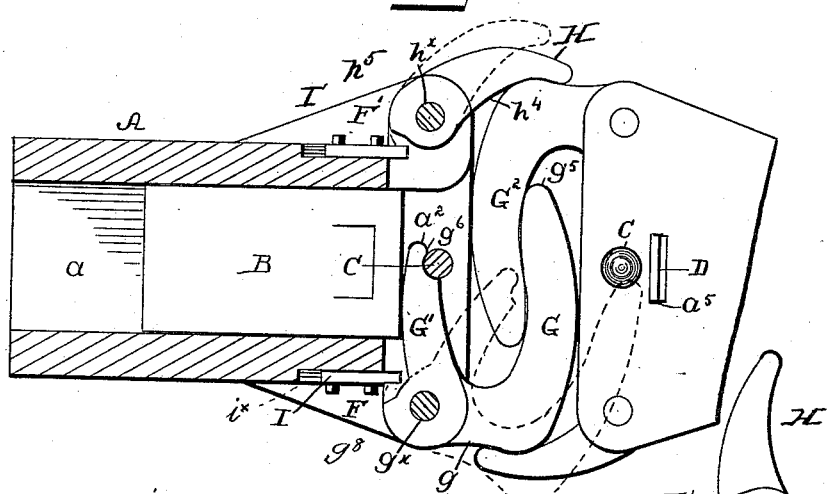
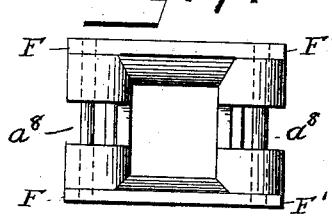
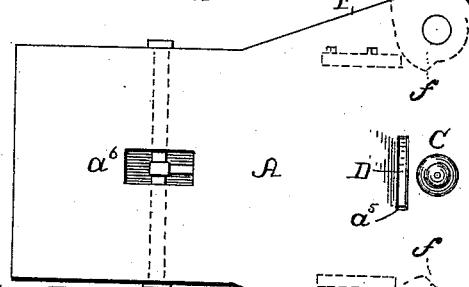
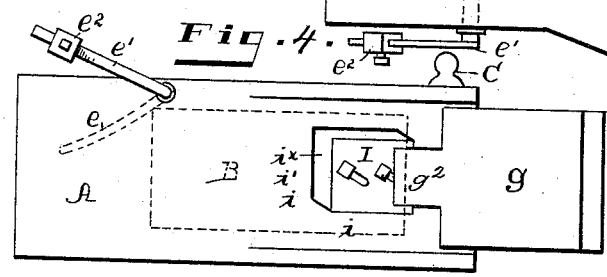
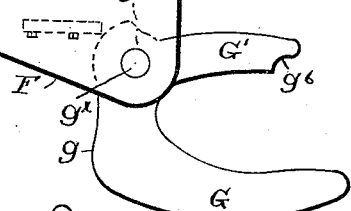
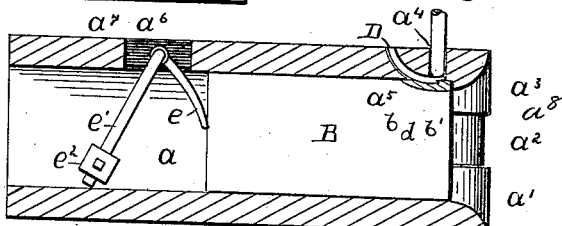
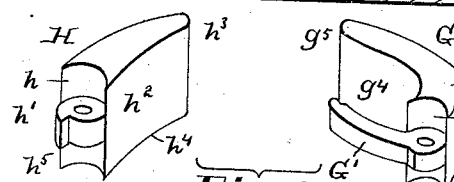
Witnesses:
Inventor
Wallace W. Gelatt
By Rich'd K. Manning Atty

UNITED STATES PATENT OFFICE.

WALLACE W. GELATT, OF CHICAGO, ILLINOIS.

CAR-COUPLING.

SPECIFICATION forming part of Letters Patent No. 444,096, dated January 6, 1891.

Application filed March 21, 1890. Serial No. 344,840½. (No model.)

*To all whom it may concern:*

Be it known that I, WALLACE W. GELATT, a citizen of the United States, residing at Chicago, in the county of Cook and State of Illinois, have invented certain new and useful Improvements in Car-Couplings; and I do hereby declare that the following is a full, clear, and exact description of the same, such as will enable others to make and use the same, reference being had to the accompanying drawings, forming a part of this specification.

My invention has for its object, first, an auxiliary car-coupling in which a vibrating grapple-bar upon one draw-head is made to engage with a similar grapple-bar upon another draw-head to enable an automatically-retained elevated coupling-pin to be released in the act of coupling the grapple-bars and secure said bars in a coupled position; second, to afford additional security to the grappling-bars when in a coupled position.

My invention further consists in the novel construction and combination of parts, which will first be fully described, and specifically pointed out in the claims.

In the drawings, Figure 1 is a view in perspective of my improved coupling, shown upon separate draw-bars in line with each other and in a coupled position. Fig. 2 is a view of separate draw-heads in line with each other and in a coupled position, showing one draw-head partially broken away in rear of the clutches in plan and the other draw-head in horizontal section. Fig. 3 is a plan view of a single draw-head, showing the clutch and guide swung outwardly in line with the sides of the draw-head, and the opening in the draw-head unobstructed and adapted to couple with the ordinary shackle. Fig. 4 is a side view of the draw-head, showing the position of the drop-plate when the coupling-pin is in a coupled position, also the self-dropping clutch-latch on the side of the draw-head. Fig. 5 is a longitudinal sectional view of the draw-head, showing the coupling retained in an elevated position by means of the drop-plate and the lip on the plunger for engaging with the drop-plate. Fig. 6 represents separate views in detail of the clutch and guide. Fig. 7 is a detail end view of the draw-head with the clutch and guide bars removed, showing the slots in the side of the draw-head. Fig. 8 is an alternate view of the clutch in the draw-head.

Similar letters of reference indicate corresponding parts in all the figures.

In the construction of my invention, A represents the draw-head of a car, which is similar in design to that in common use. Through the draw-head A, in a longitudinal direction, is made a rectangular-shaped opening $a$ of uniform width.

At one end of the draw-head the inner side portions for a short distance from said end in the direction of opening $a$ is cut away at an angle so as to present the flaring sides $a'$ of the opening at right angles to more readily admit the shackle within the draw-head. Within the draw-head at the point of meeting of the lines of the longitudinal opening $a$ and the inclined portions $a'$ is formed the throat $a^2$. Extending from the upper inner side portion of the draw-head in a downward direction a short distance in line with the throat $a^2$ is a projection $a^3$. Within the opening $a$ of the draw-head is loosely fitted a recoiling plunger B, which consists of a rectangular-shaped block. A short distance from the said throat, in the direction of the other end of the draw-bar and extending in a vertical direction through the said draw-head and intersecting with the opening $a$, is made a round opening $a^4$ of the proper dimensions to receive the coupling-pin C of similar form. A short distance in the rear of coupling-pin C and extending through the upper portion of said draw-head is made the transverse slot $a^5$, which is comparatively less in width than that of the opening $a$ within the draw-head and also of the plunger B and is narrow in depth. Said slot $a^5$ extends from the outer side portion of the draw-head in the direction of the opening $a$ in a downwardly-curved line and communicates with said opening in the inner side of the draw-head at a point a short distance in rear of the opening $a^4$ in the draw-head, which receives the coupling-pin. Within the slot $a^5$ is fitted loosely a drop-plate D, which corresponds in length and width to that of the slot $a^5$ and is bent in similar curved form. In the upper side portion of the plunger B, in line with the intersecting slot $a^5$ and the coupling-pin opening $a^4$, is made a transverse depression $b$, and formed thereby upon the end of said plunger, between the said openings $a^4$ and slot $a^5$, is a lip $b'$, which engages with the lower end portion of the drop-plate D within the rabbet $d$ of said plate. The plunger B is then retracted the proper distance within the draw-head for the entry of an ordinary shackle, and in line with the rear end portion of said retracted plunger is made a longitudinal slot $a^6$. In a transverse direction through the upper side portion of the draw-head, in line with the slot $a^6$, is made a perforation $a^7$, through which is inserted a rock-shaft E. To the rock-shaft E is attached rigidly one end of a lever $e$, the other end of which extends in a downward direction through slot $a^6$ a suitable distance within the opening $a$ and in rear of the plunger B, and is bent in a curved line toward said end of the plunger.

On one outer side portion of the draw-bar and attached at one end to the extended end portion of the rock-shaft E and at right angles thereto is a short lever $e'$, which lever, in the line of the diameter of shaft E, is at a different angle to the lever $e$. Upon the lever $e'$ is placed an adjustable sliding weight $e^2$, which is perforated to receive said lever $e'$. In place of the weight and levers a spring may be used to effect the recoil of the plunger. In line with the upper and lower horizontal surfaces on one side of the draw-head are cast or otherwise formed the right-angle-shaped flanges F F, the greatest width of the said flanges being at the extreme end of the draw-head near the opening in which the shackle is ordinarily inserted. Upon the other side of the draw-head are similarly-attached flanges F' F'.

Through the respective flanges F F F' F' are made in a vertical direction the perforations $ff$, which upon each side of the draw-head are in line with each other.

Between the respective flanges F F upon one side of the draw-head is inserted my improved automatic coupling-clutch, which consists, first, of a flat bar or knuckle $g$, which is of a sufficient length to fit between the opposite side portions of the upper and lower flanges F F and of a proper thickness. In one edge portion of the bar $g$ is made in a vertical direction a groove $g'$. Equidistant from the upper and lower end portions of the bar $g$ and rigidly attached thereto in a horizontal position in the groove $g'$ is a semicircular groove fitting lug $g^2$, through which lug in a vertical direction is made the perforations $g^3$, which are also in line with the perforations $ff$ in the flanges F F. Through the perforations $ff$ and $g^3$ is inserted the pivot $g^\times$. The other edge portion of the bar $g$ extends a considerable distance beyond the line of the end portion of the draw-head which receives the shackle and the flanged portion $a'$, and from said edge portion and at right angles to said bar $g$ is attached rigidly one fork or end portion of a hook-shaped grapple-bar G, which extends transversely in relation to and in advance of the end portion of the draw-head, in which is inserted the shackle for coupling with ordinary coupling-pins, and to a point in the direction of the other side portion of said draw-head in line with the inner vertical side portion thereof. The grapple-bar G extends comparatively the same height as that of the knuckle-bar $g$, and from said bar $g$ the bar G is bent in the direction of the draw-head in a slight degree in a curved line $g^4$. From said bar $g$ the vibrating end portion of the grapple-bar G is made tapering and with a round engaging end portion $g^5$.

In the end portion of the draw-head, in line with the lug $g^2$ on the knuckle-bar $g$ and through the flange $a'$ of the vertical side portion of the draw-head, is made a transverse opening $a^8$ of a similar width to the said lug. To the said lug $g^2$ is attached on the side portion in the direction of the opening $a^8$ one fork or end portion of the trip lever or arm G', which extends in the same line of direction as the grapple-bar G and at right angles to the bar $g$ through the opening $a^8$ in the end portion of the draw-head in a horizontal line in the direction of the other vertical inner side portion of the draw-bar between the plunger B and the coupling-pin C and to a point a short distance beyond the line of the said coupling-pin in the opening $a$ of the draw-head. In the vibrating end portion of the trip lever or arm G', in line with the coupling-pin C, is made in a vertical direction a groove $g^6$. The lug $g^2$ extends in the line of the direction of the outer side of the draw-bar toward the end portion carrying the rock-shaft E a short distance from the line of the trip-lever G', thereby forming a shoulder $g^8$, for the purpose hereinafter described. In the outer side portion of the knuckle-bar $g$ is made a slight curved depression $g^7$, which is extended in a vertical direction for the purpose hereinafter described. Upon the other side of the draw-head, between the flanges F' F', is inserted the clutch-guide H, which consists of a bar corresponding in thickness to the trip-lever G'. In one of the guide-bars H, in the edge portion thereof, is made in a vertical direction a groove $h$. Equidistant from the upper and lower end portions of said bar and extending from the said end of the bar within the groove $h$ is a semicircular lug $h'$, through which lug, in a vertical line with the perforations $ff$ in the said flanges F' F', is made a perforation $h^2$. Through the perforations $ff$ on flanges F' F' and also $h^2$ in lug $h'$ is inserted a pin $h^\times$. The other end portion $h^3$ of the guide-bar H extends beyond the end portion of the draw-head, having the grapple-bar G a short distance beyond the outer line of the grapple-bar G in its transverse position in relation to the draw-head A and is bent in a curved line of direction and with the inner line $h^4$ describing an outward curve from the end portion $g^5$ of the grapple-bar G and the said vibrating end portion $h^5$, tapered or reduced in thickness. Within the lug $h'$, in nearly a direct line drawn through the guide-arm H and upon the side in the direction of the draw-head, is made a notch or shoulder $h^5$. Upon one side of draw-head A, between the flanges F F, is made the rectangular recess $i^\times$, and placed flatwise outside of said draw-head within said recess portion of the draw-head A, near the lug $g^2$, is a flat rectangular-shaped countersunk lock-plate I. Through lock-plate I, at each end, are made the parallel slots $i\ i$, which are inclined at an angle and in the direction of the lug $g^2$. In the side of the draw-head in recess $i^\times$ and extending in a transverse direction to plate I through the slots $i\ i$ are the guide-pins $i'\ i'$. The plate I is made to slide in a vertical direction within the described limits of the slots $i$ and move in a downward direction in the recess $i^\times$ toward the lug $g^2$ and between the shoulder $g^8$ on said lug and the outer side of the draw-head. On the other side portion of the draw-head is a similar slotted countersunk plate I', which is attached in like manner to the draw-head, and the slots in which incline in the direction of the lug $h'$, and the end portion is made to enter between the shoulder $h^5$ and the outer side of the draw-head.

In another draw-head A', which is coupled with the draw-head A, the construction of the parts is the same as seen in draw-head A, the grapple-bar $G^2$ and guide-bar H' on draw-head A' being reversed in position, so that the grapple-bar $G^2$ will engage with the grapple-bar G on the opposing draw-head and the guide-bar H extend over the knuckle-bar $g$ on said draw-head.

In the operation of my improved coupler the coupling-pin is first drawn in an upward direction above the line of the lower end portion of the drop-plate, which plate immediately falls and closes the opening $a^4$ beneath, and the pin is permitted to rest upon said drop-plate in an uncoupled position. The lip $b'$ on the recoiling plunger B, as the pin is elevated enters the rabbet $d$ in the plate D under the advance movement of the lever $e$ on rock-shaft E, the force of which movement is at all times regulated by the adjustable weight $e^2$ on the lever $e'$ of shaft E. The guide-arms H are extended outwardly from the draw-head in the position as seen in Fig. 1, and secured by the locking-plate I'. Upon an opposing draw-head A', as seen in Fig. 1, the guide-arm H' is placed in the correspondingly-extended position from the draw-head A'. The grapple-bar on one draw-bar A is placed in the position as seen in dotted lines, Fig. 2, with the vibrating end portion $g^5$ of the grapple-bar G extended in the direction of the end of the plunger in the opposing draw-head. Upon the other draw-head the clutch-bar $G^2$ is placed in a like engaging position, and likewise the trip-lever G', which is nearly parallel with the respective grapple-bar G, and is also extended in a like direction. As the opposing draw-heads A A' are brought in close position, the knuckle-bars $g$ first meet the respective guides H H', which under the shock have a limited movement laterally, as seen in dotted lines, Fig. 2, and the grapple-bar G overlaps or grapples with the bar $G^2$ and both are forced together in parallel lines. The trip-lever G' in the same movement strikes against the forward end portion of the plunger B and forces said plunger back a short distance. The lip on said plunger lifts the drop-plate the proper height, uncovers the opening $a^4$, and the pin C falls through the opening $a$ in the draw-head in advance of the vibrating end portion of the trip-lever G' and in line with the groove $g'$ in said lever. The plate I on the side of the draw-head, which is retained by the lug $g^2$ in a raised position, falls automatically as soon as the shoulder $g^3$ on said lug passes the line of said plate between said shoulder and the side of the draw-head, and both draw-heads are in a coupled position. To uncouple the parts G $G^2$ the locking-plates I are first lifted from between the shoulders $g^3$ and the side of the draw-head and the coupling-pins raised above the drop-plate, when the parts may be vibrated or turned upon the pivot $g^\times$ in the direction of the sides of the draw-head and away from its position at the head of the draw-bar, and in like manner the plate I' is elevated to release the guide-bar H, which is also turned on the pivot $h^\times$ and placed in line with the side of the draw-head, so that the draw-head may then be coupled with any other draw-head having the ordinary link-and-pin coupling.

Instead of a drop-plate and the engaging plunger I may use the plunger simply without the lip, which will retain the coupling-pin the required length of time in its raised position, and I may also dispense entirely with the plunger and simply use the coupling-pin, which pin may be inserted at a slight angle in the opening $a^4$ in the draw-head, as is the well-known custom, and in the shock of the opposing draw-heads the coupling-pin drops into the opening in the draw-head and in advance of the trip-lever G', as hereinbefore described.

I have shown in the several figures of the drawings an opening through the side and end portion of the draw-head to receive the trip-lever. Instead of the opening I may obviate the necessity of such construction and make a double knuckle-bar K, as seen in Fig. 8. In this construction the knuckle-bar K is hinged to the flanges F F at one end. To the other end of the said bar is hinged the knuckle-bar $g$ of the grapple-bar G. In this manner the position of the grapple-bar and trip-lever G' is advanced in line with and beyond the end portion of the draw-head a sufficient distance to permit the trip-lever G' to enter the opening in the draw-head in line with the inclined portion a' and release the coupling-pin C, which falls and secures the trip-lever.

When the cars provided with my improved coupling are set in motion, the grapple-bars G G² first receive the strain, and this being communicated to the trip-lever the resistance to separation is afforded by the coupling-pin C, and the receiving or grooved end portion of the said trip-lever enables the strain to be communicated in line with the said lever and direct to the coupling-pin and resisted by said pin.

Having fully described my invention, what I now claim as new, and desire to secure by Letters Patent, is—

1. The combination, with the draw-head of a car having suitable longitudinal and intersecting openings for the respective shackle and coupling pin, of a knuckle-bar pivotally attached to said draw-head and a transverse forked coupling combined with said draw-head attached to said knuckle-bar, having one forked end portion in advance of said draw-head and the other forked end portion extending within the said longitudinal opening in said draw-head in the path of the coupling-pin, substantially as and for the purpose described.

2. The combination, with the draw-head of a car having a coupling-pin and suitable longitudinal and intersecting openings for the respective shackle and said pin and a rebounding-pin-supporting plunger in said longitudinal opening, of a combined forked vibrating coupling consisting of a knuckle-bar pivotally attached to said draw-head, a transverse grapple-bar in advance of said draw-head, and a transverse trip-lever contacting with said plunger extending within said longitudinal opening in the path of said coupling-pin, both connected with said knuckle-bar, substantially as and for the purpose described.

3. The combination, with the draw-head of a car, having a pivoted knuckle-bar on the side thereof, and a shoulder on said bar, of a self-dropping plate on the side of said draw-head engaging with the shoulder on said knuckle-bar, substantially as and for the purpose described.

4. The combination, with the draw-head of a car, of a knuckle-bar adapted to support a grapple-coupling having a lug pivotally attached to said draw-head, and a shoulder and a self-dropping plate on the side of said draw-head engaging with the shoulder on said lug, having slots inclined in the direction of said lug on said knuckle, and pivots in said draw-heads within said slots, substantially as and for the purpose described.

5. The combination, with the draw-head of a car, having a coupling-pin, a suitable longitudinal opening therein, a vertical opening for said pin, and an inclined slot in rear of said opening for said pin intersecting therewith in the draw-head, of a rebounding plunger in said longitudinal opening, a drop-plate in said inclined slot, and a lip on said plunger engaging with the said drop-plate within said draw-head, a knuckle-bar pivotally attached to said draw-head, and a forked coupling having one forked end portion in advance of said draw-head and the other forked end portion extending within the said longitudinal opening in the draw-head and contacting with said plunger, substantially as and for the purpose described.

6. The combination, with the draw-head of a car having a coupling-pin and suitable longitudinal and intersecting openings for the coupling-pin and shackle and a transverse opening in the end of said draw-bar, of an auxiliary coupling consisting of a knuckle-bar pivotally attached to the side of said draw-head, a combined transverse grapple-bar in advance of said draw-head, and a transverse trip-lever within the said transverse opening in the end of said draw-head and in the path of the said coupling-pin, both of said grapple and trip-lever bars being connected with said knuckle-bar, substantially as and for the purpose described.

7. The combination, with the draw-head of a car, of a knuckle-bar pivotally attached to and upon one side of said draw-head, a transverse grapple-bar combined with said knuckle-bar in advance of said draw-head, a guide-bar in the line of direction of and upon the other side of said draw-head, and a plate on said draw-head engaging automatically with said guide-bar, substantially as and for the purpose described.

WALLACE W. GELATT.

Witnesses:
AMBROSE RISDON,
FRANK L. STEVENS.